US007009442B2

(12) United States Patent
Chu

(10) Patent No.: US 7,009,442 B2
(45) Date of Patent: Mar. 7, 2006

(54) LINEAR MULTIPLIER CIRCUIT

(75) Inventor: Wei-shang Chu, San Jose, CA (US)

(73) Assignee: VIA Technologies, Inc., Taipei (TW)

( * ) Notice: Subject to any disclaimer, the term of this patent is extended or adjusted under 35 U.S.C. 154(b) by 28 days.

(21) Appl. No.: 10/879,278

(22) Filed: Jun. 30, 2004

(65) Prior Publication Data

US 2006/0001471 A1 Jan. 5, 2006

(51) Int. Cl.
*G06F 7/44* (2006.01)
(52) U.S. Cl. ...................................... 327/356; 708/835
(58) Field of Classification Search ................ 327/356; 708/835
See application file for complete search history.

(56) References Cited

U.S. PATENT DOCUMENTS 4,387,439 A * 6/1983 Lin ............................ 327/356
2004/0174202 A1 * 9/2004 Behzad ....................... 327/359

* cited by examiner

*Primary Examiner*—Long Nguyen
(74) *Attorney, Agent, or Firm*—Rabin & Berdo, P.C.

(57) ABSTRACT

A linear multiplier circuit comprises a first, a second, a third and a fourth transistor, each having a drain, a source, a gate and substantially an identity threshold voltage. Each of these four transistors operates with a fixed drain-to-source voltage applied between the drain and source, a gate-to-source voltage applied between the gate and source. The sources of the first and second transistors, and the drains of the third and fourth transistors are coupled to form the output terminal. The gate-to-source voltages of the first, second, third and fourth transistor are respectively the sum of the first and second input signals, an additionally introduced input signal, and the identity threshold voltage; the sum of the additionally introduced input signal and the identity threshold voltage; the sum of the first input signal, the additionally introduced input signal and the identity threshold voltage; and the sum of the second input signal, the additionally introduced input signal and the identity threshold voltage.

15 Claims, 1 Drawing Sheet

LINEAR MULTIPLIER CIRCUIT

BACKGROUND OF THE INVENTION

1. Field of the Invention

The present invention relates to a multiplier circuit, particularly to a linear multiplier circuit which has a better linearity between its input and output signals.

2. Description of the Prior Art

An analog multiplier is a circuit that can receive two input signals in analog form and generate an output signal proportional in magnitude to the product of the two input signals. The input signals are typically voltages, in which case the analog multiplier is customarily referred to as a voltage-mode analog multiplier. An analog multiplier can be organized either as a two-quadrant or a four-quadrant circuit. The product signal output by the analog multiplier circuit may be converted into a digital format by means of an analog-to-digital (A/D) output stage.

Analog multipliers are used in many different applications, such as modulators, phase comparators, adaptive filters, AC-to-DC converters, and sine/cosine synthesizers, to name just a few. Moreover, analog multipliers have found used in fuzzy logic controllers and artificial neural networks. In some applications it is necessary that the multiplier yield linear products of both inputs. Linear products of both inputs are easily achieved in the digital domain. However, analog multiplier circuits have a disadvantage in that they exhibit poor linearity. Improvements on the linearity of analog multipliers are difficult and expensive to achieve, particularly where the multipliers are solid-state multipliers such as those implemented in CMOS technology. This typically results in considerable cost over an analog implementation in the form of A/D and D/A converters and in general with a larger power consumption and chip area than those of an analog implementation.

SUMMARY OF THE INVENTION

Therefore, the present invention provides a linear multiplier circuit which has a better linearity between its input and output signals than the conventional multiplier circuits.

The present invention provides a linear multiplier circuit that receives a first input signal and a second input signal from its input terminals, respectively, and then generates an output current proportional to the product of the first and second input signals on the output terminal of the linear multiplier circuit. The circuit of the embodiment comprises a first, a second, a third and a fourth transistors, each having a drain, a source, a gate, and substantially an identity threshold voltage. Each one of these four transistors operates in saturation mode with a fixed drain-to-source voltage applied between the drain and source. The sources of the first and second transistors and the drains of the third and fourth transistors are coupled together. In the embodiment, the gate-to-source voltages of the first, the second, the third and the fourth transistors are respectively the sum of the first input signal, the second input signal, an additionally introduced input signal and the identity threshold voltage; the sum of additionally introduced input signal and the identity threshold voltage; the sum of the first input signal, the additionally introduced input signal and the identity threshold voltage; and the sum of the second input signal, the additionally introduced input signal and the identity threshold voltage. The additionally introduced input signal in the embodiment is used to eliminate the non-linearity occurring in the conventional multiplier circuits.

The disclosed linear multiplier circuit further comprises an operation amplifier having a first input terminal receiving a first voltage potential, a second input terminal and an output terminal; and a resistor coupled between the second input terminal and the output terminal of the operation amplifier. The drain of the first transistor receives a second voltage potential, the source of the first transistor is coupled to the second input terminal of the operation amplifier, while the gate of the first transistor is used to receive the sum of the first, second, and an additionally introduced input signals. The drain of the second transistor is configured to receive the second voltage potential, the source of the second transistor is used to couple with the second input of the operation amplifier, and the gate of the second transistor is used to receive the additionally introduced input signal. The drain of the third transistor is coupled to the second input terminal of the operation amplifier, the source of the third transistor is grounded, while the gate of the third transistor is used to receive the sum of the first and additionally introduced input signals. The drain of the fourth transistor is coupled with the second input terminal of the operation amplifier, the source of the fourth transistor is also grounded, and the gate of the fourth transistor is used to receive the sum of the second and additionally introduced input signals.

In the embodiment, the offset voltage is substantially equal to the sum of the first voltage potential and the identity threshold voltage of the transistors.

In the embodiment, the first voltage potential is substantially a half of the second voltage potential.

Thus, by using a fixed drain-to-source voltage, the non-linear factor caused by the drain-to-source voltage is eliminated, which significantly improves the linearity of the multiplier circuit.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 1:
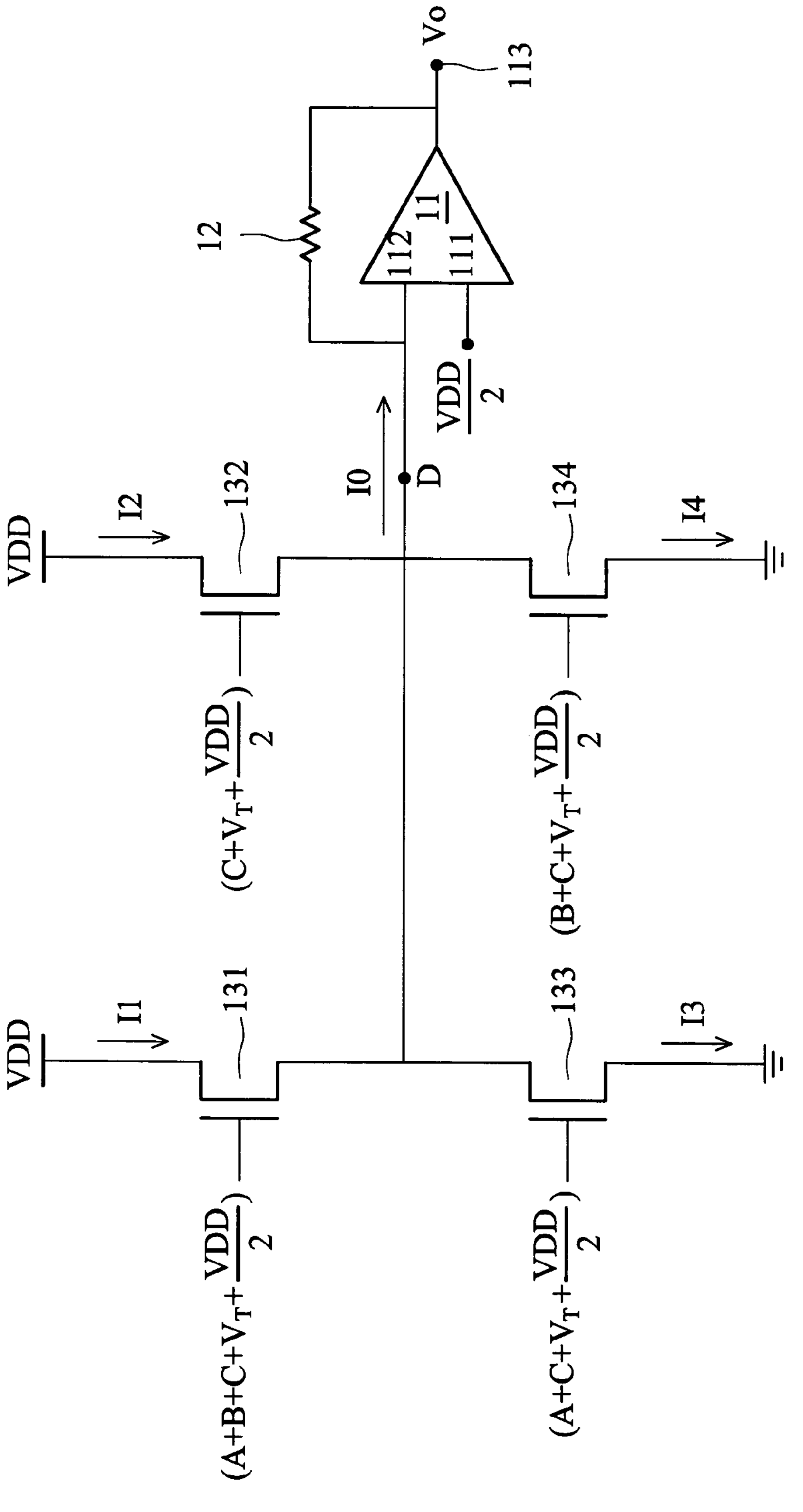
FIG. 1 is a diagram showing a linear multiplier circuit according to one embodiment of the invention.

As shown in FIG. 1, a linear multiplier circuit 1 comprises an operation amplifier 11, a resistor 12, and four transistors 131, 132, 133 and 134, wherein these four transistors substantially have an identity threshold voltage VT. The operation amplifier 11 has a first input terminal 111, a second input terminal 112 and an output terminal 113, wherein the first input terminal is configured for receiving a first voltage potential VDD/2. The resistor 12 is coupled between the second input terminal 112 and the output terminal 113 of the operation amplifier 11. The transistor 131 has a drain configured for receiving the second voltage potential VDD, a source coupled to the second input terminal 112 of the operation amplifier 11, and a gate used for receiving the sum of two input signals A and B, and an additionally introduced input signal C. The transistor 132 has a drain configured for receiving the second voltage potential VDD, a source coupled to the second input terminal 112 of the operation amplifier 11, and a gate configured for receiving the additionally introduced input signal C. The transistor 133 has a drain coupled to the second input terminal 112 of the operation amplifier 11, a source coupled to the ground GND, and a gate used for receiving the sum of the signals A and C. The transistor 134 has a drain coupled to the second input terminal 112 of the operation amplifier 11, a source coupled to GND, and a gate used for receiving the sum of the signals B and C. The sources of the transistors 131 and 132, and the drains of the transistors 133 and 134 are thus coupled with the second input terminal 112 of the operation amplifier 11 via a node D. Each of the transistors 131, 132, 133 and 134 operates under saturation mode in the embodiment. Please note that the additionally introduced input signal C is used to eliminate the non-linearity disadvantage occurring in the conventional multiplier circuit. Detailed descriptions regarding how to eliminate the non-linearity are given in the following paragraphs.

The linear multiplier circuit 1 receives the input signals A and B, and generates a current $I_o$ proportional in magnitude to the product of the input signals A and B on the node D. In order to eliminate nonlinear factors in the square rule of drain-to-source currents while operating in saturation mode, the voltage level on the node D is fixed at VDD/2 (i.e., substantially a half of the second voltage potential) by the operation amplifier 11 so that a fixed drain-to-source voltage is applied between the drain and source of each of the transistors 131, 132, 133 and 134. Moreover, the gate voltage applied to each of the transistors 131, 132, 133 and 134 includes an offset voltage substantially equal to the sum of VDD/2 and the identity threshold voltage $V_T$ so as to make sure all the transistors 131~134 can operate under saturation mode. Therefore, the gate voltage levels of the transistors 131, 132, 133 and 134 are respectively the sum of the signals A, B, C and the offset voltage, the sum of the signal C and the offset voltage, the sum of the signals A, C and the offset voltage, and the sum of the signals B, C and the offset voltage. Please note that the offset voltage applied in the gates of the transistors 131~134 is used to eliminate the voltage level VDD/2 from associated gate-to-source voltages and make sure all the transistors can operate under saturation mode. Additionally, the voltage level of the additionally introduced input signal C should be designed adaptively because a large signal C will raise a large current that may damage the transistor 131 and decrease its life for use.

Currents I1, I2, I3 and I4 flow through the transistors 131, 132, 133 and 134 respectively as shown in FIG. 1. According to the square rule of the drain-to-source current in saturation mode, a current flows through the transistor is give by $$I_{DS}=K\cdot(V_{GS}-V_T)_2\cdot(1+\lambda\cdot V_{DS}) \quad \text{(EQ. 1)}$$

where the parameter K and λare both constant parameters. Therefore, the currents I1, I2, I3 and I4 are represented as:

$$I1=(A^2+B^2+C^2+2AB+2BC+2AC)\cdot K\cdot(1+\lambda\cdot VDD/2) \quad \text{(EQ. 2)}$$

$$I2=C_2\cdot K\cdot(1+\lambda\cdot VDD/2) \quad \text{(EQ. 3)}$$

$$I3=(A_2+C_2+2AC)\cdot K\cdot(1+\lambda VDD/2) \quad \text{(EQ. 4)}$$

$$I4=(B^2+C^2+2BC)\cdot K\cdot(1+\lambda VDD/2) \quad \text{(EQ. 5)}$$

Accordingly, the current $I_o$ can be described as:

$$I_o=I1+I2-I3-I4=2AB\cdot K\cdot(1+\lambda\cdot VDD/2). \quad \text{(EQ. 6)}$$

The current $I_o$ is proportional in magnitude to the product of the input signals A and B. Additionally, the final output voltage $V_o$ on the output terminal 113 of the operation amplifier 11 is:

$$V_o=I_o\cdot R+VDD/2=2AB\cdot K\cdot(1+\lambda\cdot VDD/2)\cdot R+VDD/2, \quad \text{(EQ. 7)}$$

where R is the resistance of the resistor 12. Therefore, a linear relationship between the output voltage $V_o$ and the input signals A and B can be described as above. The voltage product of the input signals A and B can be easily obtained by eliminating associated factors K, VDD/2, R and λ shown in (EQ 7) if the output signal $V_0$ is derived for further processes. Of course, the current $I_o$ as shown by (EQ. 6) at node D may be lead out for use directly. Any person having ordinary skills in the art may select where to derive required signal from the disclosed multiplier circuit.

In conclusion, the present invention provides a multiplier circuit with a perfect linearity. With a fixed drain-to-source voltage and transistors operating in the saturation mode, the nonlinear factor caused by the drain-to-source voltage when the currents flowing from the drain to source is eliminated, which significantly improves the linearity of the multiplier circuit of the invention.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A linear multiplier circuit, receiving a first input signal and a second input signal, generating a current proportional to a product of the first and second input signals on an output terminal of the linear multiplier circuit, the linear multiplier circuit comprising:

a first transistor;

a second transistor;

a third transistor; and a fourth transistor;

wherein each of the first transistor, the second transistor, the third transistor and the fourth transistor has a drain, a source, a gate, and substantially an identity threshold voltage, and operates in a saturation mode with a substantially fixed drain-to-source voltage applied between the drain and source, a gate-to-source voltage applied between the gate and source;

wherein the sources of the first and second transistors, and the drains of the third and fourth transistors are coupled together, and the gate-to-source voltages of the first, second, third and fourth transistors are respectively a sum of the first input signal, the second input signal, an additional input signal and the threshold voltage, a sum of the additional input signal and the threshold voltage, a sum of the first input signal, the additional input signal and the threshold voltage, and a sum of the second input signal, the additional input signal and the threshold voltage.

2. The linear multiplier circuit of claim 1, further comprising an operation amplifier having a first input terminal, a second input coupled to the output terminal of the linear multiplier circuit and an output terminal, wherein the first input terminal is configured for receiving a first voltage potential so as to form the fixed drain-to-source voltage applied among the first, second, third, and fourth transistors.

3. The linear multiplier circuit of claim 2, further comprising a resistor coupled between the second input terminal of the operation amplifier and the output terminal of the operation amplifier.

4. The linear multiplier circuit of claim 2, wherein the first voltage potential is substantially a half of the second voltage potential.

5. The linear multiplier circuit of claim 1, wherein the drains of the first transistor and the second transistor are coupled to a second voltage potential and the sources of the third transistor and the fourth transistor are couple with a reference voltage potential.

6. A linear multiplier circuit, receiving a first input signal and a second input signal, generating a current proportional to a product of the first and second input signals on an output terminal of the linear multiplier circuit, wherein the linear multiplier circuit comprises:

- an operation amplifier having a first input terminal, a second input terminal and an output terminal, wherein the first input terminal is coupled for receiving a first voltage potential;
- a first transistor having a drain receiving a second voltage potential, a source coupled to the second input terminal of the operation amplifier, and a gate receiving a sum of the first and the second input signals, an additional input signal, and an offset voltage;
- a second transistor having a drain coupling with the source voltage potential, a source coupled to the second input terminal of the operation amplifier, and a gate receiving the additional input voltage and the offset voltage;
- a third transistor having a drain coupled to the second input terminal of the operation amplifier, a source coupled to a reference voltage potential, and a gate receiving a sum of the first input signal, the additional input signal, and the offset voltage; and
- a fourth transistor having a drain coupled to the second input terminal of the operation amplifier, a source coupled to the reference voltage potential, and a gate receiving a sum of the second input signal, the additional input signal and the offset voltage.

7. The linear multiplier circuit of claim 6, wherein the first voltage potential voltage is substantially half of the second voltage potential.

8. The linear multiplier circuit of claim 6, wherein the offset voltage is substantially a sum of the first voltage potential and an identity threshold voltage of the first, second third, and fourth transistors.

9. The linear multiplier circuit of claim 6, further comprising a resistor coupled between the second input terminal and the output terminal of the operation amplifier.

10. A method for generating a product of a first input signal and a second input signal in a multiplier circuit, comprising:

- generating a first current by using the first input signal, the second input signal, and an additional input signal;
- generating a second current by using the additional input signal;
- generating a third current by using the first input signal and the additional input signal;
- generating a fourth current by using the second signal and the additional input signal; and
- generating a current proportional in magnitude to the product of the first and second input signals by using the first, second, third, and fourth currents.

11. The method of claim 10, wherein the proportional current is generated by using the steps of:

- obtaining a first current sum of the first current and the second current;
- obtaining a second current sum of the third current and the fourth current;
- obtaining a current difference between the first current sum and the second current sum and outputting the current difference as the proportional current.

12. The method of claim 10, wherein the multiplier circuit operates under a saturation mode with a fixed drain-to-source voltage applied between a drain and a source of any transistor in the multiplier circuit.

13. The method of claim 10, wherein the linear multiplier circuit comprises:

- a first transistor;
- a second transistor;
- a third transistor; and
- a fourth transistor;
- wherein each of the first transistor, the second transistor, the third transistor and the fourth transistor has a drain, a source, a gate, and substantially an identity threshold voltage, and operates in a saturation mode with a substantially fixed drain-to-source voltage applied between the drain and source, a gate-to-source voltage applied between the gate and source;
- wherein the sources of the first and second transistors, and the drains of the third and fourth transistors are coupled together, and the gate-to-source voltages of the first, second, third and fourth transistors are respectively a sum of the first input signal, the second input signal, the additional input signal and the threshold voltage, a sum of the additional input signal and the threshold voltage, a sum of the first input signal, the additional input signal and the threshold voltage, and a sum of the second input signal, the additional input signal and the threshold voltage.

14. The method of claim 13, wherein the linear multiplier circuit further comprises an operation amplifier having a first input terminal, a second input coupled to an output terminal of the linear multiplier circuit and an output terminal, wherein the first input terminal is configured for receiving a first voltage potential so as to form the fixed drain-to-source voltage applied among the first, second, third, and fourth transistors.

15. The method of claim 14, wherein the linear multiplier circuit further comprises a resistor coupled between the second input terminal of the operation amplifier and the output terminal of the operation amplifier.

* * * * *